VENT PRESSURE CONTROL FOR MULTI-STAGE FLUID JET AMPLIFIER

Filed March 29, 1971

3 Sheets-Sheet 1

INVENTOR
WILLIAM S. GRIFFIN
BY
SOKOLSKI & WOHLGEMUTH
ATTORNEYS

VENT PRESSURE CONTROL FOR MULTI-STAGE FLUID JET AMPLIFIER

Filed March 29, 1971 3 Sheets-Sheet 2

INVENTOR
WILLIAM S. GRIFFIN
BY
SOKOLSKI & WOHLGEMUTH
ATTORNEYS

INVENTOR
WILLIAM S. GRIFFIN
BY
SOKOLSKI & WOHLGEMUTH
ATTORNEYS

United States Patent Office 3,717,164
Patented Feb. 20, 1973

3,717,164

VENT PRESSURE CONTROL FOR MULTI-STAGE FLUID JET AMPLIFIER

William S. Griffin, Manhattan Beach, Calif., assignor to Northrop Corporation, Los Angeles, Calif.

Filed Mar. 29, 1971, Ser. No. 129,013
Int. Cl. F15c *1/12, 1/16*
U.S. Cl. 137—81.5 3 Claims

ABSTRACT OF THE DISCLOSURE

In a multi-staged fluid amplifier, the vent pressures of the input and intermediate stages are maintained at a higher pressure than the vent of the output stage to provide optimum gain and linearity in the operation of the amplifier. This end result may be achieved by connecting the vents of the input and intermediate amplifier stages to a suitable flow restrictor while the vent of the output stage is connected to the ambient atmosphere. In a preferred embodiment this flow restrictor includes a vortex amplifier responsive to the output of the input stage such that the vent pressure is automatically adjusted in accordance with variations in the average value of the control port pressure of the input stage.

This invention relates to multi-stage fluid amplifiers and more particularly to the control of the vent pressures in such amplifiers for optimum operation.

Fluid amplifiers have come into use in recent years for various computing and control functions. Typical applications for this type of amplifier include control systems for air conditioning, flight control systems, compartment pressurizing systems, etc. Fluid amplifiers afford distinctive advantages in certain applications over their electronic counterparts in their great reliability of operation and long life. This type of amplifier is also of very simple and economical construction and is especially useful where the operating environment is relatively severe and involves considerable vibration and shock, in view of the fact that no moving parts or shock-sensitive components are utilized.

In prior art fluid amplifiers such as described, for example, in Pat. No. 3,452,665, the vents of all of the amplifier stages are generally exhausted to a common outlet which may comprise the ambient atmosphere or a pressurized compartment. It has been found that the gain of a fluid amplifier stage generally is a function of the ratio between the amplifier supply pressure and its average control port pressure. Thus, for a given supply pressure, optimum gain and linearity are achieved by maintaining the average control port pressure approximately at amplifier vent pressure. These factors are particularly significant when considering the input amplifier stage which is dealing with low level input signals and where noise-free high gain amplification is most important. With prior art techniques where the vents of all of the stages are fed to a common outlet which may be the ambient atmosphere, it is difficult to maintain the average control port pressure of the input stage low enough to maintain optimum gain and good linearity characteristics under all operating conditions. This problem is particularly accentuated when the input signal has a relatively high average value and in situations where negative feedback from the output stage to the input is utilized to enhance the stability of amplifier operation. This feedback signal has an average value which adds to that of the input.

The technique and apparatus of this invention overcome the aforementioned shortcomings of the prior art in providing means for elevating the vent pressures of all but the output stage of the amplifier preferably to the level of the average control port pressure of the input stage. Further, in a preferred embodiment, this vent pressure is adjusted in accordance with variations in the average signal level of the input control pressure, thus maintaining optimum operation in the face of such variations.

It is therefore an object of this invention to improve the performance of multi-stage fluid amplifiers.

It is another object of this invention to provide means for attaining optimum gain along with linearity in fluid amplifiers.

It is still another object of this invention to facilitate the utilization of negative feedback in fluid amplifiers without compromising amplifier gain or linearity.

It is still a further object of this invention to provide means for automatically maintaining the operation of a fluid amplifier at an optimum operating point with variations in average signal input.

It is still another object of this invention to facilitate the design of multi-stage fluid amplifiers.

Other objects of this invention will become apparent as the description proceeds in connection with the accompanying drawings, of which:

Briefly described, the technique and apparatus of this invention is as follows:

The vents of all of the amplifier stages of a fluid amplifier except the output stage are coupled to a common outlet which provides a pressure above that of the output stage vent. In one embodiment, the vents are connected to a flow restrictor which establishes vent pressure at a value which is substantially equal to the estimated average control port pressure for the input stage. In a preferred embodiment the flow restrictor comprises a vortex amplifier which is responsive to average input stage control port pressure and which varies the vent pressures in accordance with variations in the input stage control port pressure.

Figure 1:
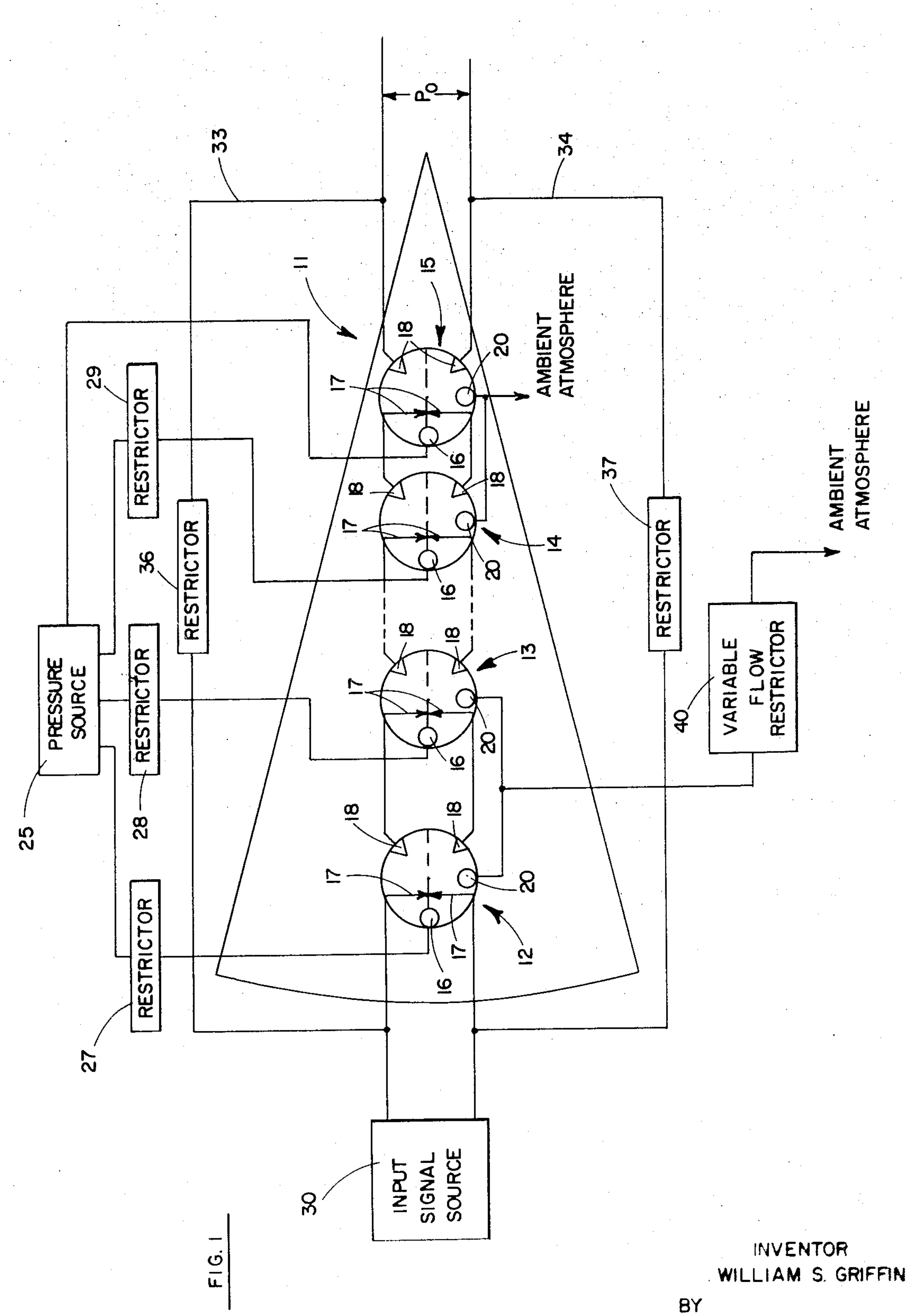
FIG. 1 is a schematic drawing of one embodiment of the device of the invention.

Referring now to FIG. 1, one embodiment of the device of the invention is illustrated. The amplifier 11 comprises a plurality of fluid amplifier stages 12–15. The amplifier stages 12–15 are all similar in configuration and may be conventional fluid amplifiers such as described, for example, in Pat. No. 3,429,248. Each amplifier includes a supply pressure port 16, a pair of opposing control nozzles 17, a pair of output ports 18 and a vent 20. The jet of gas supplied to the supply port 16 is directed to output ports 18 in accordance with the pressure differential between the jet streams from nozzles 17.

Pressurized gas is supplied from pressure source 25 to each of supply ports 16 of amplifiers 12–14 through restrictors 27–29 respectively with amplifier 15 receiving the direct output of the pressure source. The restrictors are adjusted so that the pressures supplied to stages 12–15 are progressively greater. Typically, for example, stage 12 might have a supply pressure of 1 p.s.i.g. with stage 15 having a supply pressure of about 15 p.s.i.g.

A differential pneumatic input signal is fed from input signal source 30 to the control jets 17 of input amplifier 12, the pneumatic output signal developed in response to this input being fed from output ports 18 to the jet nozzles of stage 13; and thence to amplifiers 14 and 15 from which the output signal $P_o$ is developed. Negative feedback is provided from the output of amplifier 15 to the input of amplifier 12 via lines 33 and 34, these lines having restrictors 36 and 37 therein respectively for adjusting the amount of feedback. As already noted, this feedback signal raises the average level of the input to stage 12. The vents 20 of stages 12 and 13 are connected to variable flow restrictor 40 while the vents of stages 14 and 15 are vented to the ambient atmosphere. Thus, the vents of stages 12 and 13 are held at higher pressure level than that of stages 14 and 15. The pressure level provided by restrictor 40 to vents 20 of stages 12 and 13 is preferably selected so that it is equal to the anticipated average pressure level of the total input signal to the control pressure ports of stage 12. In this manner, input stage 12 can be operated with optimum gain-linearity characteristics even with elevated average control port input pressure. It is to be noted, of course, that with this embodiment, the optimum adjustment can only be approximated in view of changes in the average pressure input to the input stage which would be encountered under normal operating conditions. Thus, there is no adjustment for such changes except by manual adjustment of the variable flow restrictor 40.

Figure 2:
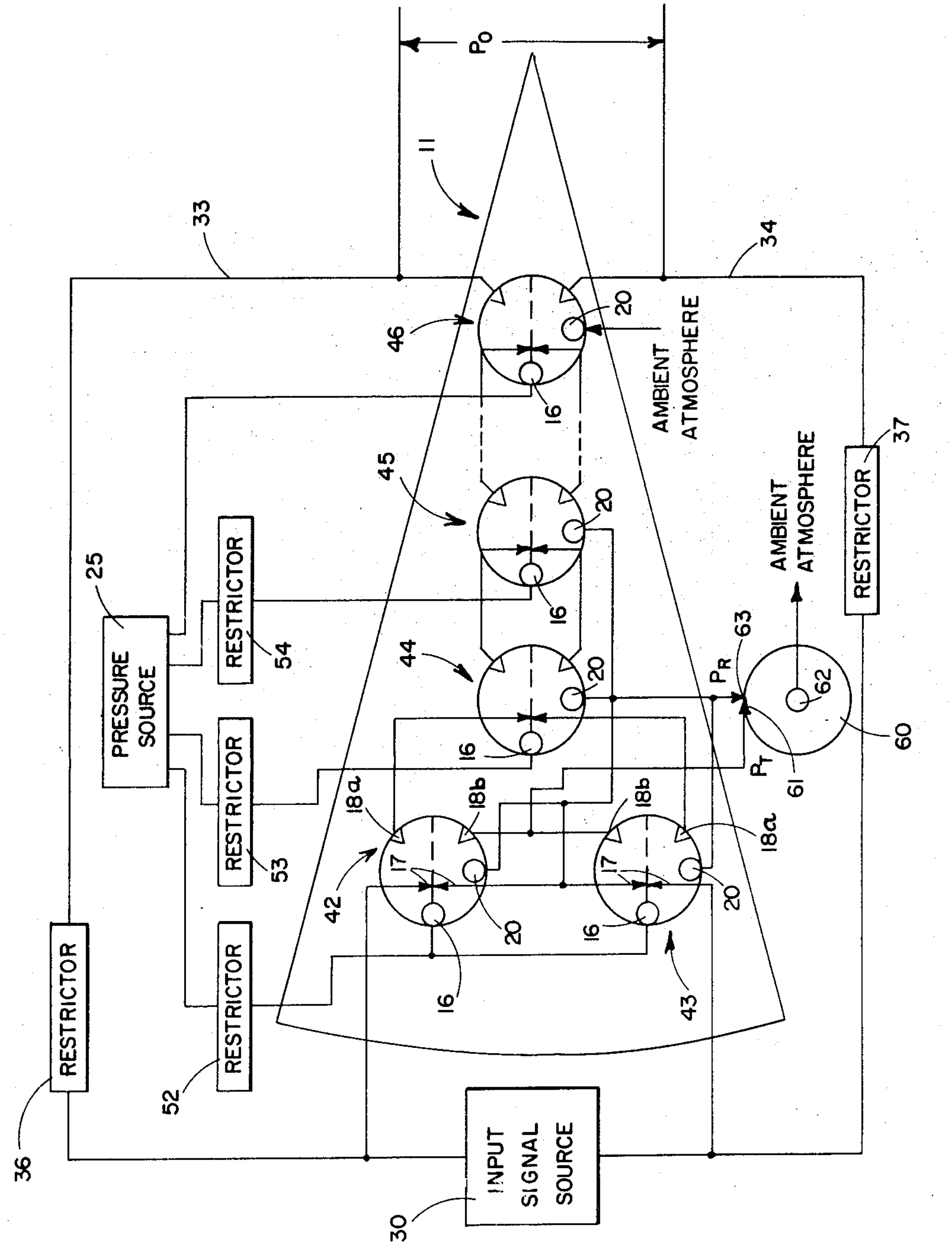
FIG. 2 is a schematic drawing of a preferred embodiment of the invention.

Referring now to FIG. 2, a preferred embodiment of the device of the invention is illustrated in which the vent pressure of the input and intermediate stages is automatically adjusted with changes in the input stage control port pressure to maintain optimum operation at all times. Amplifier 11 includes a push-pull input stage formed by amplifier units 42 and 43 which receives a differential pressure input signal across its control jets 17 from input signal source 30. The pressure signal received by the push-pull input stages 42 and 43 is successively amplified in cascaded single ended stages 44–46, resulting in an output signal $P_o$ from output stage 46. Progressively increasing pressure inputs are provided from pressure source 25 through restrictors 52–54 to the supply pressure ports 16 of stages 42, 43–45 respectively, with stage 46 receiving the full output of source 25, in the same manner as described for the first embodiment. Also, as for the first embodiment, negative feedback is provided from the output of stage 46 to the inputs of stages 42 and 43 through lines 33 and 34 and restrictors 36 and 37. This embodiment, however, differs from that previously described in that the vents 20 of stages 42–45 rather than being connected to a conventional flow restrictor are rather commonly connected to the radial port 63 of vortex amplifier 60. The commonly connected output ports 18*b*, the output of which reflects the average control input to the push-pull input stage, is connected to the tangential port 61 of amplifier 60. The vent 62 of amplifier 60 is fed to the ambient atmosphere.

A vortex amplifier, as is well known in the art, is comparable to a valve which controls flow rate in accordance with a control signal, such control signal generally being applied to the tangential control port 61. As to be explained more fully in connection with FIGS. 3 and 4, as the tangential pressure, $P_T$ supplied to port 61 increases, the flow from outlet port 62 decreases and vice versa. Vortex amplifier 60 functions as a valve and as its output flow is lowered, the pressure, $P_R$ at its radial port 63 is increased, this pressure increase being reflected at the vents 20 to which the radial port is connected. Thus, the pressure at the vents 20 of stages 42–45 varies directly in accordance with the average control pressure input to stages 42 and 43.

Figure 3:
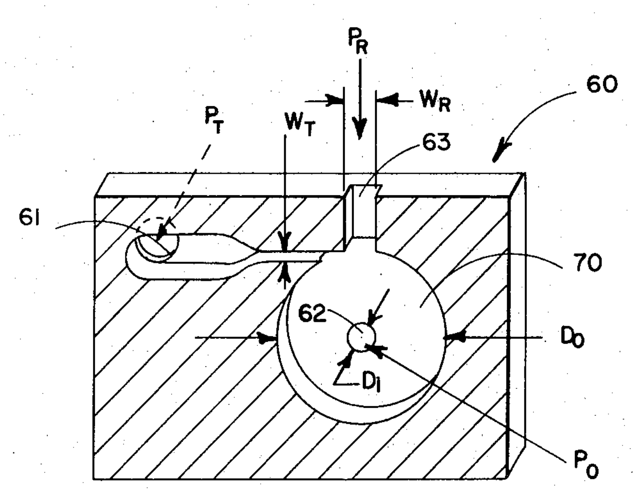
FIG. 3 is a schematic drawing illustrating a vortex amplifier which may be utilized in the embodiment of FIG. 2, and FIG. 4 graphically illustrates the operation of the vortex amplifier of FIG. 3.
Figure 4:
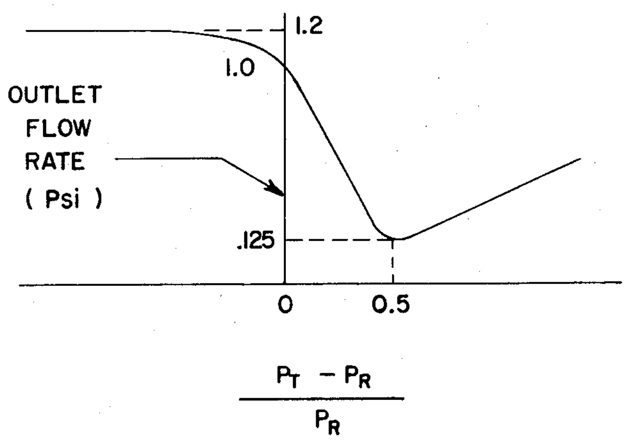

Let us now refer to FIGS. 3 and 4 for a more complete explanation of the function of the vortex amplifier. A typical vortex amplifier as shown in cross seciton in FIG. 3 may comprise a central enclosed cylindrical chamber 70 having a tangential inlet 61, a radial inlet 63 and a centrally located outlet port 62. The following diameters have been identified in FIG. 3 as follows:

Width of tangential inlet: $W_T$
Width of radial inlet: $W_R$
Diameter of chamber 70: $D_o$, and
Diameter of outlet port: $D_i$ For a typical design $$\frac{D_o}{D_i}=4\text{–}8,\ \frac{W_R}{D_i}=2\text{–}3 \text{ and } \frac{W_R}{W_T}=2\text{–}5$$

Referring now to FIG. 4, a graph illustrating the outlet flow rate from outlet port 62, as plotted against the tangential pressure $P_T$ to port 61 minus the radial pressure $P_R$ to port 63 divided by the radial pressure $P_R$, is shown. It can be seen from this graph that as long as the tangential pressure $P_T$ is less than 3/2 times the radial pressure $P_R$, the outlet flow rate from port 62 will decrease with increases in tangential pressure. As already noted, such increases in tangential pressure produce a corresponding increase in radial pressure to provide the desired automatic adjustment of vent pressures for the amplifier. Obviously, it is essential that the operation of the vortex amplifier be maintained in the portions of the curve where $$\frac{P_T-P_R}{P_R}$$

is between 0 and .5.

It is to be noted that while the amplifier of FIG. 2 has been shown with a push-pull input stage, it could also be implemented to equal advantage with a single ended input stage as shown in FIG. 1. The push-pull input, however, provides a convenient source of a signal in accordance with the average level of the input.

The apparatus and technique of this invention thus provides highly effective means for optimizing the gain and linearity characteristics of a fluid amplifier. As indicated in connection with the description of a preferred embodiment, this end result can be achieved and maintained automatically with changing operating conditions of the amplifier by automatically controlling the vent pressures of the input and intermediate stages of the amplifier by means of a vortex amplifier.

While this invention has been described and illustrated in detail, it is to be clearly understood that this is intended by way of illustration and example only and is not to be taken by way of limitation, the spirit and scope of this invention being limited only by the terms of the following claims.

I claim:

1. A multi-stage fluid amplifier formed from a plurality of amplifier stages, each of said stages including an amplifier unit having a supply port, a pair of output ports, a pair of control ports and a vent port, said amplifier comprising:

an input stage formed by a pair of said amplifier units connected in push-pull configuration, means for providing a differential input signal to the control ports of said input stage, said input stage providing a differential signal in accordance with the input thereto, said signal appearing between one of the output ports of one of the amplifier units thereof and one of the output ports of the other of the amplifier units thereof, intermediate and output amplifier stages for receiving and amplifying the differential output of the input stage, and a vortex amplifier for automatically adjusting the vent port pressure of said input stage, said vortex amplifier having a tangential port, a radial port and an outlet port, the other of the output ports of each of the amplifier units of the input stage being commonly connected to the tangential port of the vortex amplifier, the vent ports of the amplifier units of the input stage being connected to the radial port of the vortex amplifier, whereby the vent port pressures of the amplifier units of the input stage are varied directly in accordance with the average of the input signal to the input stage.

2. The amplifier of claim 1 wherein the vent ports of the intermediate amplifier stages are connected to the radial port of the vortex amplifier.

3. The amplifier of claim 2 wherein the vent port of the output stage is connected to the ambient atmosphere.

References Cited

UNITED STATES PATENTS

| | | | |
|---|---|---|---|
| 3,587,609 | 6/1971 | Di Camillo | 137—81.5 |
| 3,603,334 | 9/1971 | Davies et al. | 137—81.5 |
| 3,610,265 | 10/1971 | McGuinness | 137—81.5 |
| 3,488,948 | 1/1970 | Cornett et al. | 137—81.5 X |
| 3,556,121 | 1/1971 | Urbanosky | 137—81.5 |
| 3,565,091 | 2/1971 | Auget | 137—81.5 |
| 3,568,702 | 3/1971 | Dustin | 137—81.5 |
| 3,572,357 | 3/1971 | Philbrick | 137—81.5 |
| 3,587,608 | 6/1971 | Fortier | 137—81.5 |
| 3,610,261 | 10/1971 | Turek | 137—81.5 X |

SAMUEL SCOTT, Primary Examiner